United States Patent [19]
Johnson

[11] Patent Number: 5,800,578
[45] Date of Patent: Sep. 1, 1998

[54] AIR SEPARATION SYSTEM INCLUDING A TANGENTIAL SEPARATOR AND A PNEUMATIC RELAY CONVEYER

[75] Inventor: Richard D. Johnson, Memphis, Tenn.

[73] Assignee: Air Conveying Corporation, Memphis, Tenn.

[21] Appl. No.: 721,151

[22] Filed: Sep. 26, 1996

Related U.S. Application Data

[63] Continuation-in-part of Ser. No. 508,106, Jul. 27, 1995, Pat. No. 5,641,339.

[51] Int. Cl.$^6$ .............. B01D 45/12; B01D 50/00
[52] U.S. Cl. .............. 55/302; 55/337; 55/340; 55/345; 55/349; 55/452; 55/460; 95/268; 95/280; 209/27; 209/137; 209/250; 209/712; 209/719; 406/173
[58] Field of Search .............. 95/268, 271, 280; 55/337, 338, 339, 340, 331, 302, 345, 349, 459.1, 459.2, 460, 417, 415, 451, 452, 454, 455; 209/139.2, 148, 137, 250, 711, 712, 715, 719, 720, 722, 27, 29; 406/171, 173

[56] References Cited

U.S. PATENT DOCUMENTS

| | | | |
|---|---|---|---|
| 325,521 | 9/1885 | Finch | 55/338 |
| 840,301 | 1/1907 | Cook | 209/719 |
| 1,009,576 | 11/1911 | Riemenschneider | 209/250 |
| 2,076,988 | 4/1937 | Garrett | 55/452 |
| 2,102,499 | 12/1937 | Wallace | 55/452 |
| 2,166,925 | 7/1939 | Mitchell | 209/250 |
| 2,236,548 | 4/1941 | Prouty | 55/345 |
| 2,304,778 | 12/1942 | Cresswell | 55/452 |
| 2,391,863 | 1/1946 | Bowen | 55/340 |
| 2,418,061 | 3/1947 | Weinberger | 55/459.1 |
| 2,643,734 | 6/1953 | Rowell | 209/250 |
| 3,031,825 | 5/1962 | De La Fourniere | 55/460 |
| 3,116,238 | 12/1963 | Van Etten | 55/459.1 |
| 3,615,009 | 10/1971 | Norton | 209/712 |
| 3,618,303 | 11/1971 | Nagel | 55/460 |
| 3,797,661 | 3/1974 | Buzga | 95/268 |
| 3,878,091 | 4/1975 | Hukki | 209/715 |
| 4,090,857 | 5/1978 | Ferri et al. | 55/337 |
| 4,108,778 | 8/1978 | Lambert et al. | 55/337 |
| 4,248,699 | 2/1981 | Hukki | 209/722 |
| 4,251,356 | 2/1981 | Harte | 209/250 |
| 4,269,701 | 5/1981 | Hock et al. | 209/250 |
| 4,300,926 | 11/1981 | Brooks | 55/319 |
| 4,378,234 | 3/1983 | Suzuki et al. | 55/338 |
| 4,484,843 | 11/1984 | McGlinsky et al. | 406/170 |
| 4,721,561 | 1/1988 | Oetiker et al. | 55/459.1 |
| 4,900,345 | 2/1990 | Le Jeune | 55/337 |
| 5,294,218 | 3/1994 | Fiorentini et al. | 55/460 |
| 5,336,285 | 8/1994 | Grandek et al. | 55/337 |

FOREIGN PATENT DOCUMENTS

| | | | |
|---|---|---|---|
| 108604 | 1/1968 | Denmark | 209/250 |
| 1053472 | 3/1959 | Germany | 209/250 |
| 460078 | 2/1975 | U.S.S.R. | 209/250 |
| 664689 | 5/1979 | U.S.S.R. | 209/250 |

*Primary Examiner*—Duane S. Smith
*Attorney, Agent, or Firm*—Fitch, Even, Tabin & Flannery

[57] ABSTRACT

A separating system for separating material transported by air utilizing apparatus having a tangential inlet for a stream of air and entrained material, a bottom material exit, a boundary wall air exit and a central interior air exit. Each air exit includes a perforated wall or screen through which air is removed or separated from the entrained material. Enhanced separating action is achieved through coupling two such separators in a loop arrangement such that the material discharge from a first separator is conveyed via a relay stream of air to serve as the input to a second separator, while the entire air exhaust from the second separator is returned as one of a plurality of inlet streams to the first separator. A further advantage is realized by partitioning the air exhaust of the first separator into a plurality of parallel passageways which can be individually closed. Associated with each passageway is a nozzle through which a compressed air blast is introduced into the passageway that is effective to reverse the air flow therein and clear the associated perforated wall or screen of accumulated scrap material without halting the material separating operation.

17 Claims, 7 Drawing Sheets

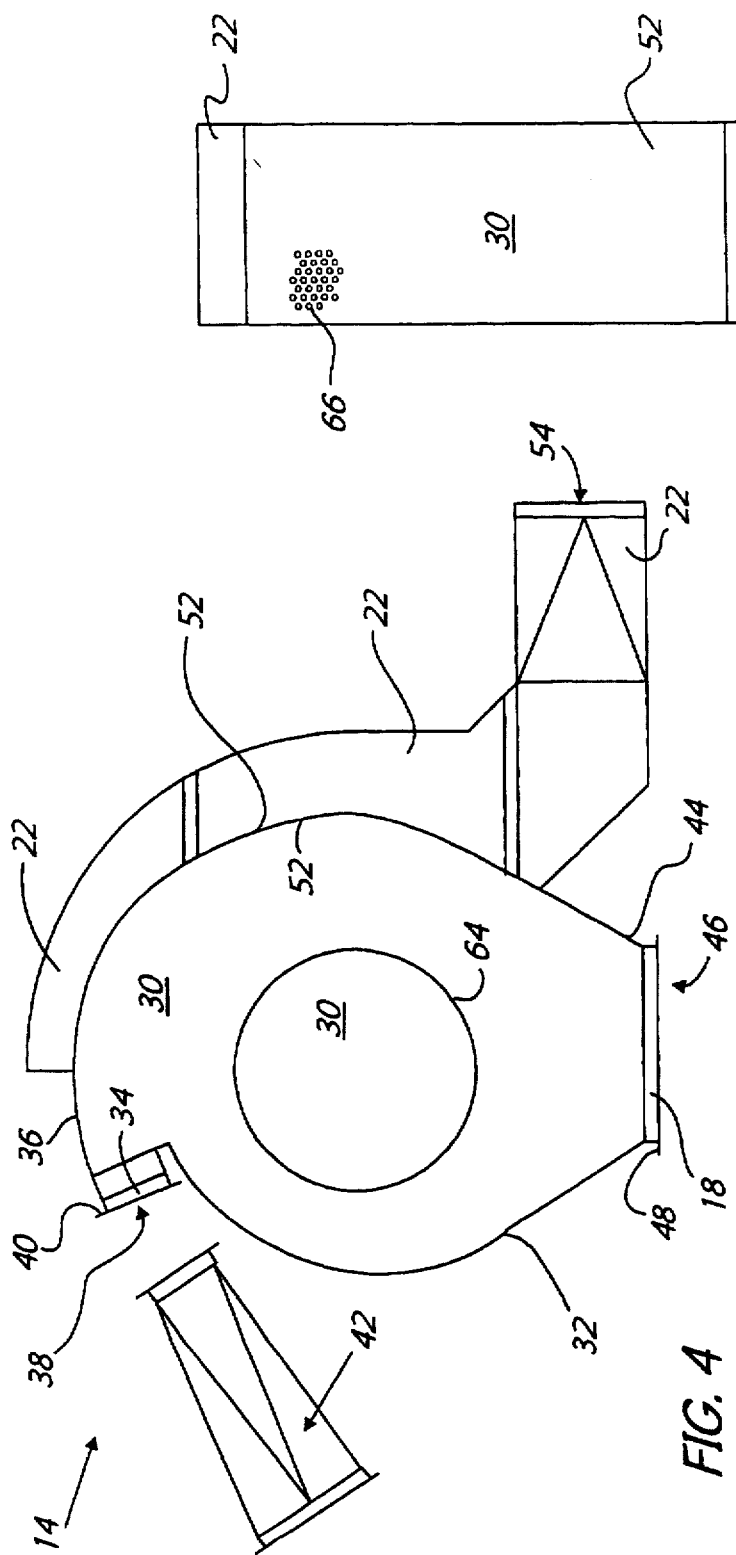
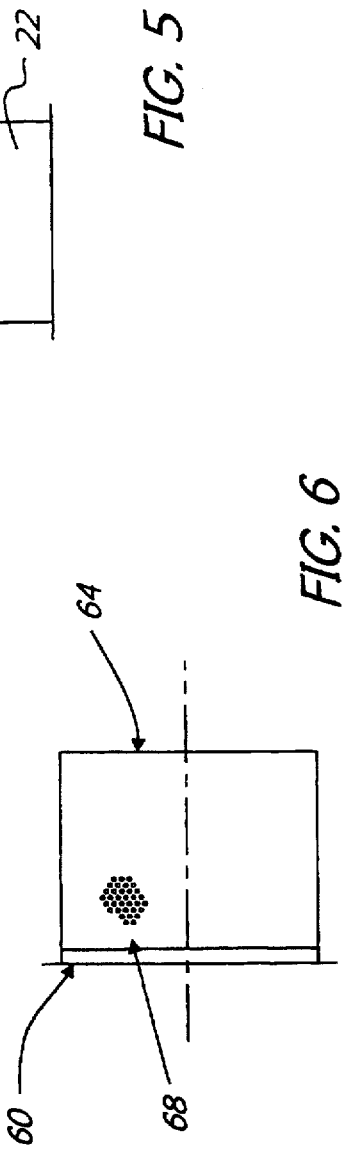
FIG. 5
FIG. 4
FIG. 6

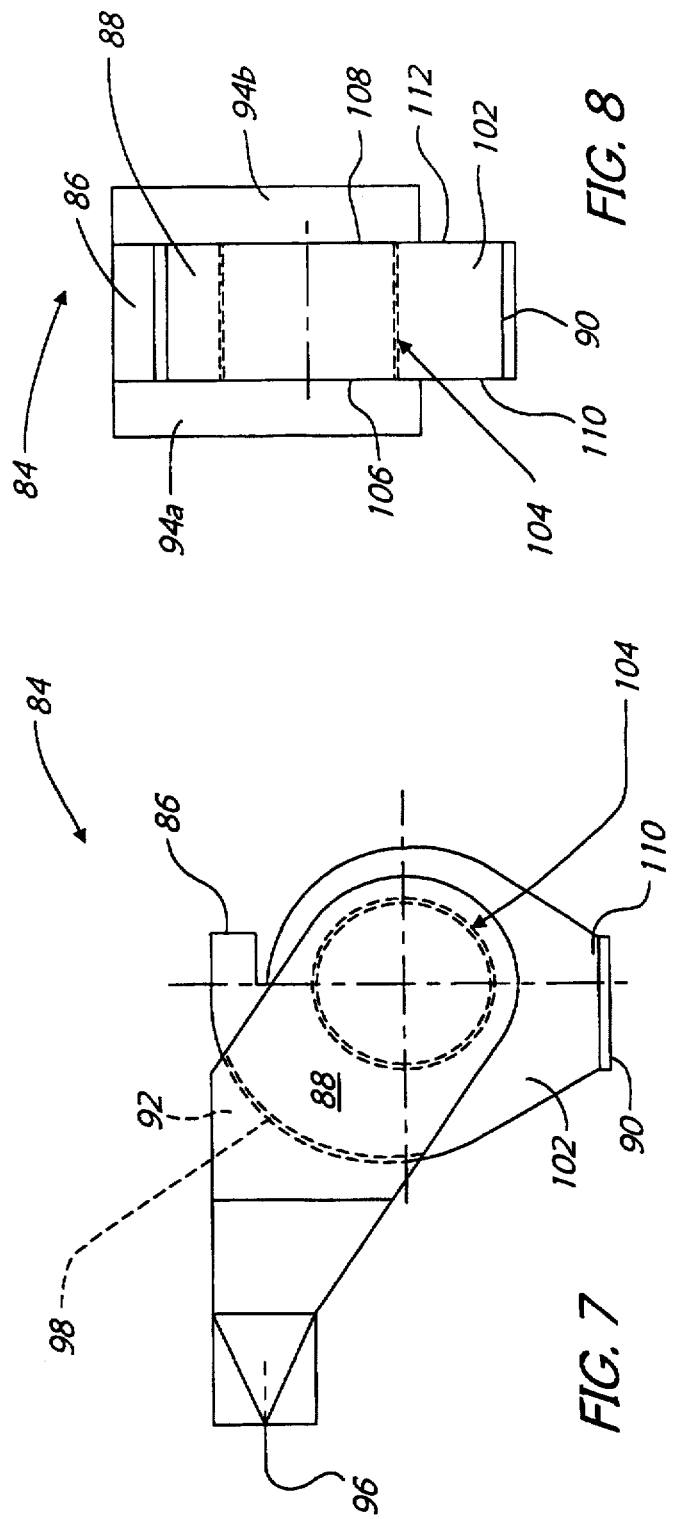

AIR SEPARATION SYSTEM INCLUDING A TANGENTIAL SEPARATOR AND A PNEUMATIC RELAY CONVEYER

CROSS REFERENCE TO RELATED APPLICATIONS

This application is a continuation-in-part application of U.S. patent application Ser. No. 08/508,106 filed Jul. 27, 1995, now U.S. Pat. No. 5,641,339 issued Jun. 24, 1997.

FIELD OF THE INVENTION

The present invention relates to air separators and more particularly to an improved method and apparatus for separating and accumulating airborne material.

BACKGROUND OF THE INVENTION

A wide variety of separators have been developed that separate and accumulate various objects transported by an air stream, such as paper waste, scrap material, food items, or other products. These separators utilize various configurations which are designed to receive a high velocity stream of air transporting prescribed objects, and subsequently separate the objects from the conveying air. The objects are typically accumulated at or near a designated exit, while the air or other transport gas is directed to a second exit. A problem associated with many separating systems, and particularly in separating systems design for the collection of scrap paper, is that they typically generate a large amount of dust and/or other air-borne contaminants proximate the material exit.

One type of separator that has been extensively used is a cyclone separator wherein the transported objects and a stream of air are introduced into a large cylindrical or cone-shaped device. The transported objects are introduced into the cylindrical housing so that they are thrust against the outer wall by centrifugal forces resulting from the flow of the air stream within the cylinder. The air exits via the top of the cylindrical device while the objects are typically funneled out a bottom exit. Cyclone separators are generally very large and somewhat expensive pieces of mechanical equipment. Cyclone type separators are often so large that it is not feasible to install them inside a building. Consequently, most cyclone type separators are typically situated outside the building and often on the roof of the building. Reducing the dust in these exterior cyclone separators has not been of great concern because the presence of dust outside a building typically does not adversely affect people or equipment.

A prior art cyclone separator system that is concerned with the separation of dust from the transported objects is disclosed in U.S. Pat. No. 3,116,238 issued to Van Etten. The '238 patent discloses a modified cyclone-type separator that includes a standard central air discharge member which conducts air from the cyclone-type separator. It also includes a screen disposed along one outer wall of the separator to facilitate the separation and removal of dust and fine particles from the stream of air and conveyed material. While this device attempts to address the problem caused by dust being associated with the stream being conveyed, there remain several other problems associated with this patented device. Namely, it still requires a very large device, and the air within the housing remains at a high velocity and thus a relatively high static pressure.

Another type of separator is a tangential separator where the transported objects are recovered on a flat or cylindrical screen and the air which passes through the screen exits the separator in a generally tangential orientation. Tangential separators are typically smaller devices than the cyclone separators and thus are often installed within the confines of a building or factory. For this reason, the air exiting the tangential separator is typically reintroduced into the interior environment of the building or is reused within the air conveying system. In either situation, it becomes increasingly important to filter the exiting air prior to its reuse and to minimize the dust and other contaminants introduced into the environment near the material exit.

Most applications in which tangential air separators are used can be classified either as a positive ("push type") system, a draw through ("pull type") system, or a hybrid system. As the classification suggests, draw through or "pull type" systems are those in which the air stream and transported objects are pulled into the separator with a fan located downstream of the separator. In such draw through systems, the separator is typically maintained below atmospheric pressure and typically requires an air lock to prevent any back flow of air from the object discharge exit. Positive or "push type" systems, on the other hand, include systems where the air and conveyed objects are blown into the separator with the fan located upstream of the separator. In push type systems, the pressure within the separator is above standard atmospheric pressure. The hybrid systems involve both "pushing" as well as "pulling" of the conveying air stream such that an ideal pressure is maintained within the separator.

Clearly, the static pressure within the tangential separator is an important design consideration. Consider for the moment, a push type paper conveying and separation system where the paper material exits the separator and falls to a baler or compactor. If the static pressure at the material exit of the separator unit is too high, dust and paper scraps tend to swirl around the material exit resulting in a somewhat untidy and very dusty environment proximate the material exit. However, if the static pressure at the air and material inlet in the separator unit is too low, the result is an inefficient conveying system susceptible to clogging.

Pull type systems and hybrid type systems alleviate some of the aforementioned static pressure concerns but are generally more complex and more expensive systems. Moreover, the push type tangential separator systems are often the simplest to design, and are easy to install and maintain.

One related art tangential air separator is disclosed in U.S. Pat. No. 4,900,345 issued to Le Jeune which discloses the use of a deformed cylindrical grid in a tangential separator which allows most of the air flow to exit tangentially through the separator. The remainder of the air together with the transported objects presumably exit through a central exit portion of the separator via the spiral nature of the deformed cylindrical grid.

Another related art tangential separator system is disclosed in U.S. Pat. No. 4,300,926 issued to Brooks which discloses a separation apparatus adapted to receive a stream of airborne material and which includes a single rear exit screen and a bottom material exit. An adjustable baffle is located near the separator inlet directing the incoming stream to the rear exit screen which allows the air to exit tangentially while the material continues to be transported through separator. The separator is designed with an increasing cross-sectional area for decelerating the transported material as it moves through the duct.

Still another related art system is disclosed in U.S. Pat. No. 4,484,843 issued to McGlinsky et al. which shows a multi-chamber pneumatic conveying scrap paper system that also utilizes a flat rear exit screen for passing air and dust while the paper is directed and/or falls downward to a gathering hopper.

While these related art systems may adequately separate the transported material from the air stream, there remains a need to provide an improved tangential separator that is relatively small device, yet simple to install, operate and maintain and, more importantly, that facilitates the relatively clean discharge of material.

SUMMARY OF THE INVENTION

In one aspect, a tangential air separator for separating material transported by air has now been constructed which includes a casing having a tangential inlet adapted to receive a stream of air and material and a plurality of air exits. The separator casing includes a perforated arcuate outer wall proximate the inlet which is disposed in the direct path of the incoming air stream and which functions as a means for peripherally removing a portion of the air from the stream of air and material received at the inlet. An important advantage offered by this perforated wall is that it decreases the velocity of the stream of air transporting the material and also reduces the static pressure within the separator casing. A second air separation device is disposed in the interior of the casing and is designed to further separate the air from the material entrained therein, leaving mostly the transported material.

Two separate and distinct air exits are provided. A first air exhaust conduit is peripherally attached to the casing and operatively associated with the arcuate boundary wall, and a second air exhaust conduit is operatively associated with the interior air separation device. A third exit from the separator casing serves as the material discharge exit which, like the inlet, is located along the circumference of the generally cylindrical casing. Because of the multiple air exits, the static pressure is relatively low at the material discharge exit, thus avoiding significant problems normally associated with swirling dust and particles near the collection site.

In one aspect of the invention, the air and material inlet is tangentially oriented near the top of the generally cylindrical shaped casing, and the material discharge exit or outlet is located at the bottom of the casing. The perforated arcuate wall which is aligned with the direct path of flow of the air and material into the casing. The interior air exit means is a perforated tube or hollow cylinder coaxially disposed in the cylindrical shaped casing. The second air exhaust conduit is preferably constructed to provide bi-directional exit flow of air out of each side of the cylindrical-shaped casing in the region of the tubular air-separation device.

In another aspect of the invention, the exhaust air flows exiting through the first and second conduits of the separator apparatus are combined at the separator and carried away in a single air discharge conduit. Appropriate filtering means is incorporated within such an air discharge conduit so that the separated air can be safely re-introduced into the plant instead of being discharged into the outside atmosphere. The relatively small size of the present tangential separator as compared with a cyclone separator, makes it particularly suitable for use inside a building.

Yet another aspect of the invention is realized through the coupling of two separators in a loop configuration in a manner that significantly reduces the static pressure proximate the material discharge and thus the dust at the collection site. Two such separators are coupled such that the entire material discharge from the first separator is conveyed via a stream of air to the input of the second separator, and the air exhaust of the second separator is recycled as one of a plurality of air input streams entering the first separator.

Still another aspect of the invention is realized by partitioning the air exhaust conduit into a plurality of parallel passageways which can be individually closed off. Each passageway includes an air nozzle or the like through which a compressed air blast can be introduced into the passageway which reverses the wall of accumulated material. By sequentially closing each passageway one-by-one during the cleaning operation, there is no need to shut down the separating operation for cleaning. Rather, while one section of the perforated outer wall aligned with one passageway is being cleaned, the other passageways continue to permit the exhaust flow of air from the cylindrical casing as part of the separation process. In this manner, all the sections of the perforated outer wall can be sequentially cleared of accumulating material without ceasing the material separating operation.

The invention may also be characterized as a method for separating material transported by air which comprises the steps of: receiving one or more streams of air and material at a tangential inlet into a casing; removing a portion of air from the stream of air and material via a peripheral air exit located proximate to the inlet in order to decrease the velocity of the air transporting the material and to reduce the static pressure within the casing; directing the removed portion of air away from the casing via a first exhaust conduit; separating further air from the material within the interior of the casing and transporting such separated air out of the casing via a second exhaust conduit; and discharging the material remaining in the casing via a material outlet located at the periphery of the casing at a location spaced from the inlet. Advantageously, the first air exhaust conduit is partitioned into a plurality of passageways so that accumulating material and dust can be sequentially cleaned from sections of the peripheral air exit without halting the above-described method.

Optionally, the material-separating method further comprises the steps of: conveying the discharged material from the first separator via an air stream to an inlet of a second separator; separating a portion of the air which enters the second separator via a peripheral air exit and further centrally separating air from the material within the second separator so as to reduce the static pressure at a lower material discharge exit therefrom; directing the removed portion of air back to the first separator by applying suction from a relay blower; and discharging the material from the second separator through such lower exit into an underlying baler.

The present method and apparatus for separating airborne material realizes the aforementioned features and advantages in a manner that is clearly evident from a thorough consideration of the detailed description when taken in conjunction with the drawings wherein there is shown and described illustrative embodiments of the invention.

BRIEF DESCRIPTION OF THE DRAWINGS

In the following detailed description, reference will be made to the attached drawings in which:

FIG. 4 is a side cross-sectional view of the separator similar to FIG. 2, but looking from the opposite end generally along line 4—4 of FIG. 3;

FIG. 5 is a cross-sectional view taken along line 5—5 of FIG. 2 illustrating the perforated outer wall of the separator;

FIG. 6 is a front elevational view of the interior perforated hollow cylinder shown in section in FIG. 4;

FIG. 7 is a side view of an alternative embodiment of a separator embodying various features of the invention;

FIG. 8 is a front view of the separator illustrated in FIG. 7;

FIG. 9 is a top view of the separator apparatus illustrated in FIG. 7;

DETAILED DESCRIPTION OF THE PREFERRED EMBODIMENTS

The following description includes the best mode presently contemplated for carrying out the invention. This description is not to be taken in a limiting sense, but is made merely for the purpose of describing the general principles of the invention. The scope of the invention should be determined with reference to the claims.

Figure 1:
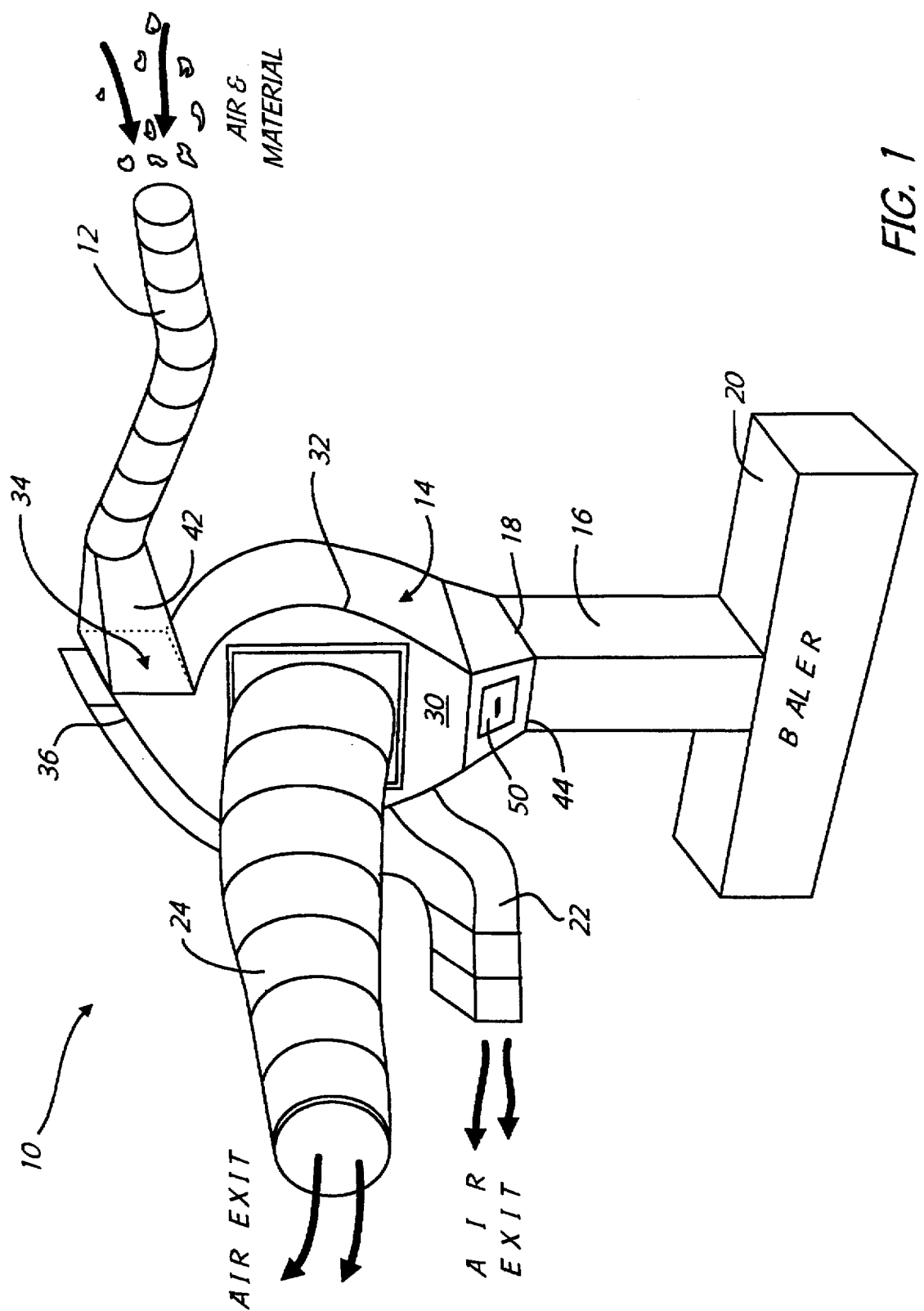
FIG. 1 is a perspective view of a tangential separator system for separating, accumulating and baling airborne material, such as paper scrap, which employs a separator embodying various features of the present invention.

Referring to FIG. 1, there is illustrated a tangential air separator system 10 particularly suited for separating material, such as scrap paper or scrap corrugated fiberboard, which is conveyed in a stream of air inside a factory or other building. The illustrated tangential air separating system 10 includes an inlet duct 12 or network of inlet ducts, a tangential separator apparatus 14, an outlet chute 16 leading from a material discharge exit 18 of the separator apparatus 14 to a baler or compactor 20, and a plurality of air exhaust conduits 22, 24 extending away from the separator apparatus 14. The illustrated system 10 is a "push type" tangential separator wherein the air stream carrying the conveyed material is blown through the inlet duct 12 into the separator apparatus 14 using a blower or fan (not shown) associated with the inlet duct 12 and located upstream of the separator apparatus 14. The conveyed material is effectively separated from the air stream within a separating chamber 30 within the apparatus 14. Most of the air stream exits the separating chamber 30 via the air exhaust conduits 22, 24 while the conveyed material exits via the material discharge exit 18 to the chute 16 heading to a baler or compactor 20. The air being discharged through the air exhaust conduits 22, 24 is then filtered and subsequently recycled and/or re-introduced into the immediate environment or discharged to the atmosphere exterior of the building.

The size of the separator apparatus 14 and associated ducting is very much dependent on the volume of the air stream necessary to efficiently convey the material as well as the general character of the scrap paper being separated. Further, the illustrated embodiment can be easily modified to include multiple inlets and/or multiple separating chambers sharing the same air exhaust conduits.

Figures 2, 3:
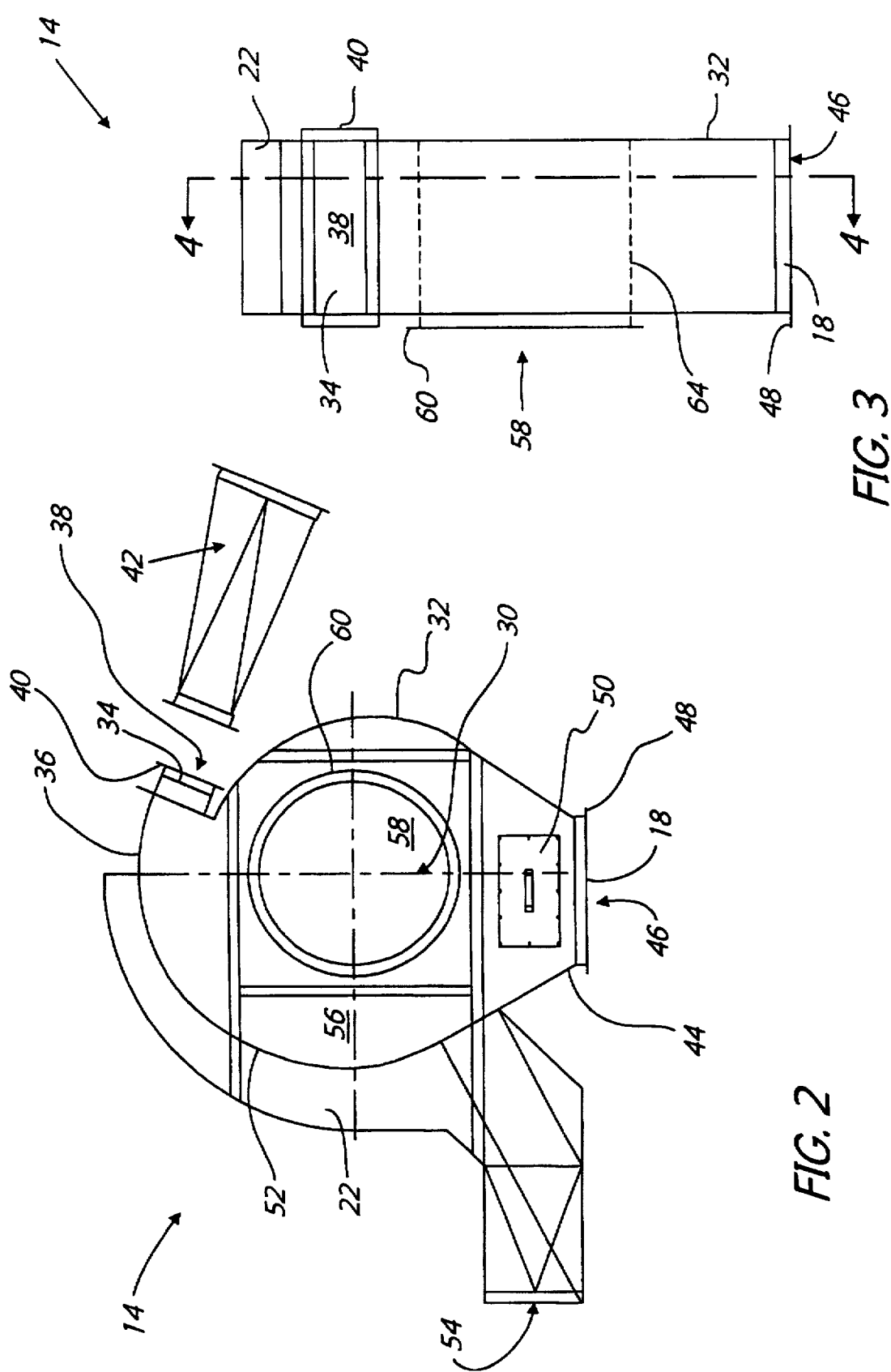
FIG. 2 is a side elevational view of the central separator illustrated in FIG. 1 with the air inlet conduit shown spaced from its point of connection.
FIG. 3 is a front view of the separator illustrated in FIG. 1.

FIGS. 2 and 3 illustrate side and front views of the separator apparatus 14. As seen therein, the separator apparatus 14 is a generally cylindrical shaped casing 32 having a tangentially oriented air and material inlet 34 located at or near the top 36 of the cylindrical casing 32. For example, a typical inlet 34 may be a 10 inch by 29 inch rectangular opening 38 with a two inch wide flange or collar 40 disposed around its perimeter to facilitate attachment to the inlet duct 12. The illustrated embodiment further includes an inlet transition adapter 42 having a length of about 39.5 inches to facilitate connection between a standard 18 inch diameter inlet duct 12 and the rectangular opening 38 of the air and material inlet 34 on the separator apparatus 14. Advantageously, the inlet transition adapter also increases the cross sectional area of the incoming duct, e.g. by about 15%, thereby slowing the velocity of the airstream slightly.

The separator apparatus 14 further has a material discharge exit 18 is located at the bottom 44 of the generally cylindrical casing 32. For example, the material discharge exit 18 may be a 29 inch by 29 inch opening 46 with a two inch wide flange 48 disposed around the perimeter of the opening 46 to facilitate connection to the feed chute 16 leading to the baler 20.

The illustrated separator apparatus includes the two air exhaust conduits 22, 24 and has a separator chamber access door 50. The first air exhaust conduit 22 is peripherally attached immediately downstream of a perforated back outer or boundary wall 52 which forms a section of the circular cross section cylindrical casing 32 and leads away therefrom to an air outlet 54 located from the cylindrical casing 32. The second air exhaust conduit 24 is connected to a side or end wall 56 of the cylindrical casing 32 and is in fluid communication with the interior of the cylindrical casing 32 which provides the separating chamber 30. In particular, the illustrated separator apparatus 14 has a 36 inch diameter hole 58 centrally located in one end wall 56 of the generally cylindrical casing 32, with a standard 36 inch diameter angle ring 60 extending from the side hole 58 for engagement with the second air exhaust conduit 24. The separated air that is being exhausted through the conduits 22 and 24 has a substantially free flow path to the atmosphere within or outside the plant although it may be routed through a bag filter or the like.

FIG. 4 is a cross-section view of the separator apparatus 14 depicting the separating chamber 30 and its operative elements which separate air from the stream of air and material in two distinct stages. The first stage of air separation is accomplished by the strategically located perforated arcuate back outer wall 52 of the cylindrical casing 32 leading to the first air exhaust conduit 22. The second stage of air separation is accomplished by a perforated hollow cylinder 64 of circular cross section centrally disposed in the separating chamber 30, i.e. generally coaxial with the cylindrical casing 32. The interior of the perforated metal hollow cylinder 64 communicates with the second air exhaust conduit 24 through the side hole 58 as seen in FIG. 1, and it is conveniently dimensioned with about the same diameter as the hole.

As seen more clearly in FIG. 5, the perforated arcuate wall 52 extends downward from the top 36 of the cylindrical casing 32 and constitutes a substantial portion of the its back wall. The cross sectional area of the surface of the perforated wall 52 may be about 18.4 square feet. The perforated wall is preferably #12 gauge perforated sheet steel with a plurality of 0.15625 inch diameter holes 66 separated by 0.1865 inch and having staggered centers. Similarly, as seen in FIG. 6, the perforated hollow cylinder or tube 64 is advantageously made of the same #12 gauge sheet steel perforated with a plurality of 0.15625 inch diameter holes 68 and might be dimensioned to form a 36-inch diameter tube about 29 inches long. The perforated hollow cylinder 64 is stationary and coaxially mounted within the cylindrical casing 32 in alignment with the side hole 58. The angle ring 60 which is affixed to the end wall 56 may be used to support one end of the hollow cylinder 64 and to serve as a connector for engagement with the second air exhaust conduit 24. Relative to the 18.4 sq. Feet back wall, the perforated cylinder 64 may have a cross sectional area of about 22.5 square feet.

In operation, the incoming stream of air and material enters the separating chamber 30 via the inlet transition adapter 42 (See FIGS. 1 and 4). In addition to connecting the separator apparatus 14 to the standard inlet ducting 12, the inlet transition adapter 42 also acts to slightly decelerate the stream due to the generally increased cross-sectional area of the inlet transition adapter 42. As the mixed stream enters the separating chamber 30, it encounters the perforated surface 52 of the separator apparatus 14. The dimensions of the perforations 66 and cross sectional area of the arcuate perforated surface 52 are chosen such that between about 50% and 75%, and more preferably about 60% of the volume of the air stream is immediately removed (i.e. passes through the back wall perforations) by separation from the transported material which slides along the arcuate surface and remains within the separating chamber 30 at this location. Much of the material slides along the outer or back wall 52 of the cylindrical casing 32 in a downward direction as a result of the forces created by this tangential entry into the generally right circular cylindrical configuration of the separating chamber 30. This natural segregation of the formerly entrained material in the region adjacent the outer wall facilitates the separation of much of the residual air from the material through the centrally disposed perforated hollow cylinder 64. Again, the perforation size and dimensions of the perforated hollow cylinder 64 are chosen to allow most of the remaining air, and only the air, to escape. The formerly entrained material moving in such a generally arcuate path around the cylindrical casing reaches the bottom 44 of the casing 32 where it exits via the material discharge exit 18. Typically the material falls through a feed chute 16 into the hopper of a horizontal compactor or baler 20. The strategically centrally disposed perforated hollow cylinder further slows the velocity of the material and the remaining air entering the opening 46 and substantially reduces the static pressure of this location within the casing.

Overall, the pressure drop between the inlet duct 12 and the material discharge exit 18 is preferably accomplished in three discrete steps. First, a small pressure drop is realized as the incoming air flow traverses the inlet transition adapter 42. Preferably, an expansion of about 15% is effected at this location; for example, the cross-sectional area of inlet transition adapter 42 may gradually decrease from approximately 254 in² at the entrance to about 290 in² where it discharges to the inlet 34 to the separating chamber 30. Second, a major pressure drop is realized due to the removal of a substantial volume of the air via the perforated arcuate boundary wall 52. A final major pressure drop results from the separation of further air from the material centrally within the interior of the separating chamber and the subsequent removal of that air through the side exhaust conduit 24. The shape, location, and the dimensions of both perforated walls 52 and 64 relative to one another are important as well as their positions and orientations to the inlet 34 and material discharge exit 18. It is the result of these design considerations that the present separator apparatus 14 achieves a pressure drop of a magnitude which has heretofore not been accomplished in a "push-type" separator system.

The combination of separating air at two stages within a single separator apparatus, one peripherally positioned along a boundary and one centrally located within the generally cylindrical casing, provide a synergistic effect resulting in a greater than expected reduction in static pressure across the separator casing. By way of comparison, the present embodiment demonstrates about a 25% lower level of static pressure near the material discharge exit than a comparably sized "push-type" separator having only a centrally disposed exit. Likewise, the present embodiment is believed to have a much lower static pressure near the material discharge exit than a comparably sized "push-type" separator having only a peripheral exit located at a boundary of the casing. This dual air separation feature minimizes the problems associated with swirling dust and other particles near the ultimate collection site, i.e. the baler hopper, and allows the design of the separator to be made even more compact than previous designs for accommodating a comparable volume of flow, while achieving comparable effectiveness.

The air exiting the separating chamber 30 is channeled by the multiple exhaust conduits 22, 24 and usually released at locations that are distant from the separator apparatus 14. Air flows freely through the air exhaust conduits 22, 24 and can be discharged within the building for re-use to convey additional material or can be discharged exterior of the building. An appropriate bag filter or the like can be incorporated within such air exhaust conduits 22, 24, and such is preferred when the air is discharged inside the building.

Considering the operation of the presently described embodiment, the preferred method of separating material transported by a stream of air is defined by four essential steps. These four steps include: (1) receiving a stream of air and material through an inlet to a casing which is oriented tangentially at the arcuate periphery of a generally cylindrical casing, which casing is of larger cross section than the inlet so expansion will occur; (2) removing a major portion of the air from the incoming stream by separating it via a perforated arcuate outer or boundary of the casing that is located closely downstream of the inlet; (3) separating most of the remaining air from the material within the interior of the casing using a secondary separating device; and (4) discharging the formerly entrained material through a material outlet located at the bottom of the casing which is spaced around the circular periphery from the inlet a distance equal to at least about 180° of arc, as a result of which an unexpectedly large pressure drop is realized between the inlet and the material discharge exit. As indicated above, the pressure drop between the inlet and the material discharge exit is accomplished in three discrete stages corresponding to steps (1) through (3) above, with the air being separated in steps (2) and (3) above being channeled away from the casing to one or more air outlets by separate exhaust conduits through which the air can flow freely.

An alternative embodiment of a tangential separator 84 of this general type is illustrated in FIGS. 7–9. The separator 84 includes an inlet 86 for a stream of air and material, a generally cylindrical separating chamber 88, a bottom material discharge exit 90 and a plurality of air exhaust conduits 92, 94a and 94b extending from the chamber that lead to a common air outlet 96. The conveying air is effectively separated from the material within the separating chamber 88 which comprises a cylindrical casing 102 of generally right circular cylindrical configuration having a perforated metal back wall 98 and within which a perforated hollow cylinder 104 is centrally disposed.

The separator illustrated in FIGS. 7–9 closely resembles that described with reference to FIGS. 1–6 with the exception of including three air exhaust conduits 92, 94a and 94b. The separator 84 again incorporates two distinct separating stages. The perforated arcuate back outer wall 98 of the generally cylindrical casing 102 separates a major portion of the air from the material being conveyed. In particular, as the stream of air and entrained material tangentially enters the separating chamber 88 via the inlet 86, it impacts upon the perforated arcuate wall 98 of the casing 102 through which a major portion of the air passes while the entrained material slides along the surface and is directed in a downward direction along the arcuate perforated surface. The dimensions of the perforations and cross sectional area of the perforated wall 98 are chosen such that between about 50% and 75%, and more preferably about 60% of the volume of the entering air stream passes through the perforations.

The remaining portion of the air in the entering stream finds a ready exit in a perforated hollow cylinder 104 which is centrally disposed in the separating chamber 88, positioned generally coaxial to the cylindrical casing 102. The size of the perforations as well as the dimensions of the perforated hollow cylinder 104 are chosen to allow much of the remaining air from the entering stream to be separated from the material. The air passing through the perforated cylinder 104 exits the casing 102 via dual air exhaust conduits 94a and 94b which respectively communicate with each end 106, 108 of the perforated cylinder 104 and which are affixed to the respective end walls 110, 112 of the casing. The formerly entrained material continues along the arcuate path to the bottom of the casing 102 where it exits via material discharge exit 90.

The central air exhaust conduits 94a and 94b advantageously provide bi-directional flow of the air out of the separating chamber 88 through each side thereof, and such bi-directional flow from the center of the separator 84 further promotes air removal and tends to maintain the air exit velocity at moderate levels. The plurality of air exhaust conduits 92, 94a and 94b are joined together at a location downstream from the separator 84 into a common air outlet 96. If desired, the air exiting the separator can be passed through a filter (not shown) to remove dust before the exit air is discharged either inside or outside of the building. Such an arrangement retains the advantage of having multiple air exits from the separator while simplifying the incorporation of a filter, preferably one which allows relatively free flow of air from the casing to the eventual outlet.

Figure 10:
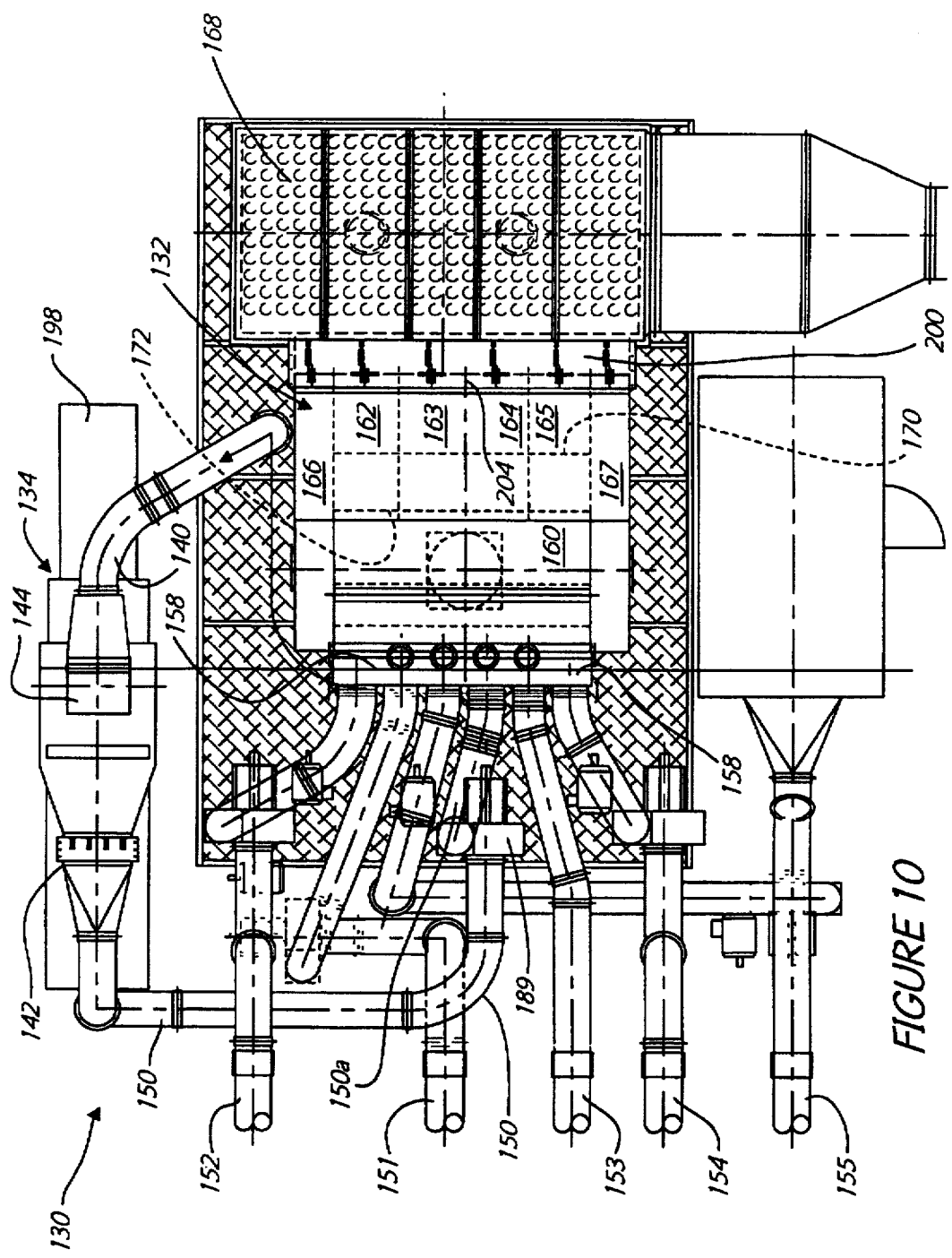
FIG. 10 is a top view of another embodiment of a tangential separating system for separating and accumulating airborne material, embodying various features of the present invention.
Figure 11:
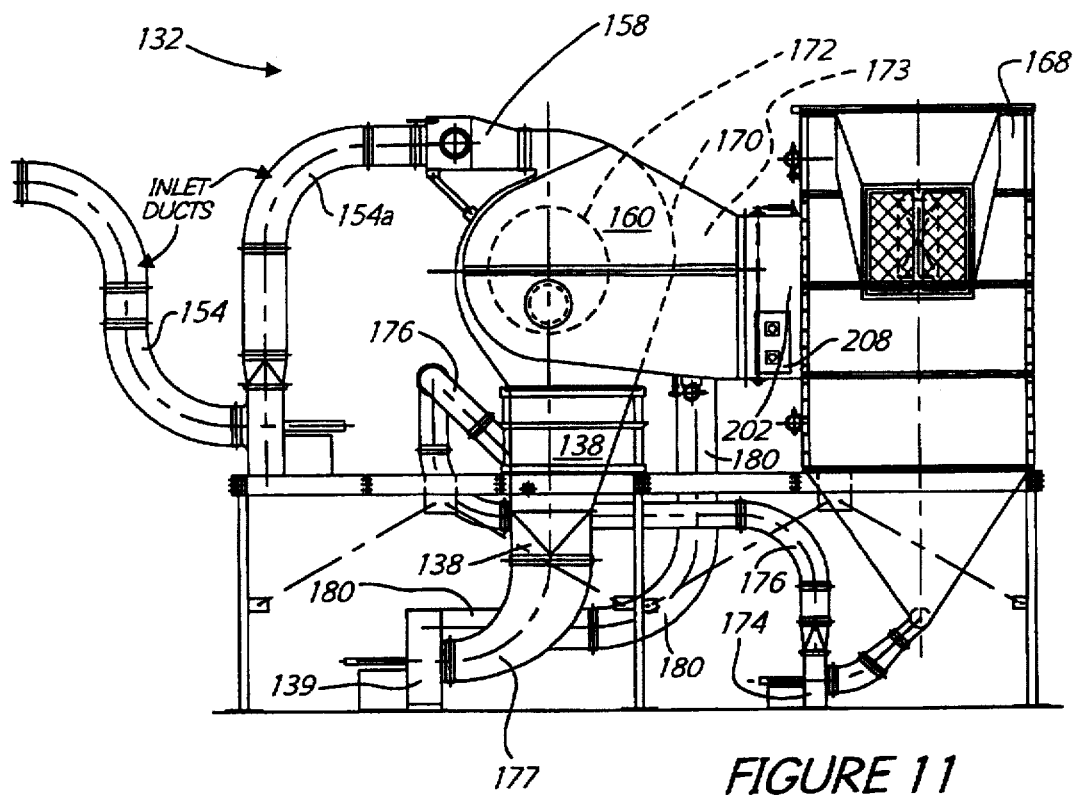
FIG. 11 is a fragmentary side view of the separating system illustrated in FIG. 10 with some components omitted to better show the primary separator.
Figures 12, 14:
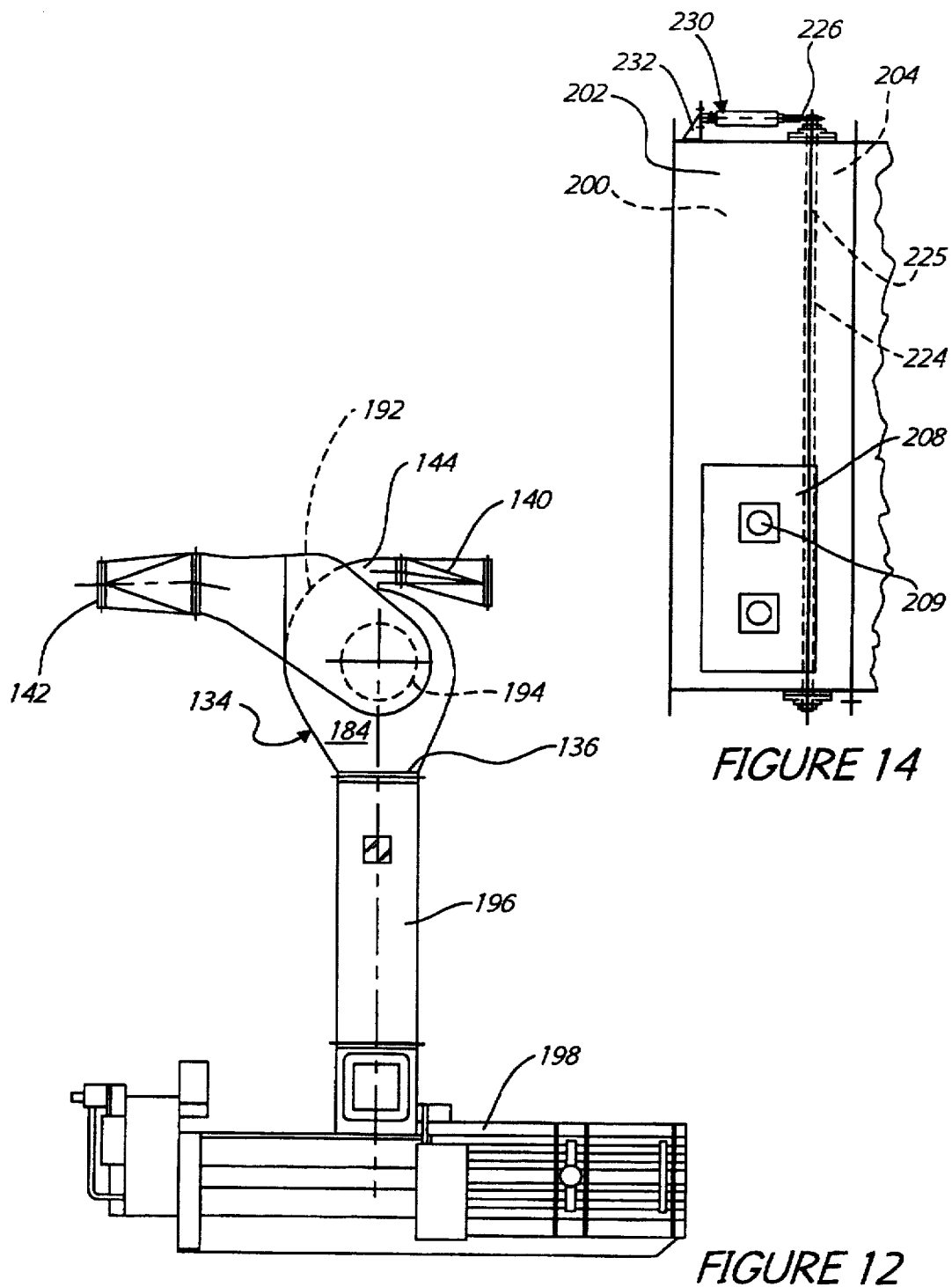
FIG. 12 is a fragmentary side view of a portion of the system illustrated in FIG. 10 showing the secondary separator positioned atop the baler, taken from a location between it and the primary separator.
FIG. 14 is an enlarged fragmentary side view of looking at the right-hand side.

A further improved tangential separating system 130 is shown in FIGS. 10–12 which is particularly well-suited for handling paper and corrugated board scrap from a corrugated box-making plant. In the separating system 130, a pair of separators 132 and 134 are coupled in a loop configuration in a manner that still further reduces the static pressure at the material collection site below an outlet 136 from the separator 134. The two separators are coupled such that the material exiting an outlet 138 at the bottom of the first separator 132 is conveyed in a stream of air driven by a main relay blower 139 to an inlet duct 144 leading into the second separator 134 which is located vertically above the ultimate collection site. A single duct 140 connects the material discharge outlet from the first separator 132 to the inlet 144 of the second separator 134. An exhaust air stream exits from the second separator 134 through an air exhaust conduit 142 and is recycled as one of several input streams to the first separator 132. In the illustrated embodiment, the first separator 132 receives a plurality of air input streams 150, 151, 152, 153, 154, and 155.

In the tangential separating system 130 for separating and accumulating airborne material, the two separators 132, 134 each operate in generally the same manner as the separator described with reference to FIGS. 1–6 and to FIGS. 7–9; however, the system couples the two separators in a loop arrangement. Various features of the separators 132, 134 that are common to those previously described are not repeated in detail hereinafter.

The separator 132 serves as the primary separator and receives six distinct input streams via ducts 150, 151, 152, 153, 154, 155 which converge into a single inlet manifold duct 158 that tangentially discharges into a generally cylindrical primary separating chamber 160. As shown in FIG. 11, each duct, such as duct 154, may include a final section 154a downstream of a blower. The primary separator 132 includes a compartmented outlet plenum downstream of air-separating devices having a plurality of passageways 162, 163, 164, 165, 166 and 167; it is located intermediate of the separating chamber 160 and an exhaust plenum 168 through which the separated air leaves the vicinity of the system. The conveyed material is effectively separated from the air stream within the separating chamber 160 using a bifurcated air separating technique as hereinbefore described that employs both an air exit at the arcuate boundary wall and a centrally disposed tubular air separator located interior of the separating chamber 160. The boundary wall air exit utilizes a perforated back wall section 170 (FIG. 11) of the separating chamber 160, and a centrally disposed perforated metal tube 172 serves to separate additional air from the material.

A major portion of the air carrying the entrained material exits the separating chamber 160 through the perforated back wall 170 while the material slides downward along the arcuate perforated wall. The dimensions of the perforations and cross sectional area of the arcuate perforated wall 170 are selected such that between about 50% and 75% of the volume of the air stream entering the separating chamber 160 passes through the perforated wall 170, while the formerly entrained material stays within the separating chamber 160. An additional portion of the air which enters the chamber exits through the centrally disposed perforated tube 172, and the size of the perforations are again chosen to separate a desired additional amount of the remaining air from the material. The formerly entrained material exits the separating chamber 160 through the bottom material outlet 138.

The air which is separated through the back wall 170 exits from the separating chamber 160 immediately enters a plurality of air exhaust passageways 162, 163, 164 and 165 (FIG. 10) which are formed by vertical partitions 171 in an exhaust chamber 173; these passageways lead to chamber 200 that empties into the exhaust plenum 168. The two outermost air exhaust passageways 166 and 167 in the chamber 173 are in communication with the opposite ends of the perforated tube 172 and likewise lead to the chamber 200. If filters are disposed in the exhaust plenum 168, dust which may accumulate on such filters and fall therefrom may be collected in a chute at the bottom of the plenum 168 and advantageously transported via a third relay blower 174

(FIG. 11) and connecting conduit 176 to the material discharge outlet 138 of the primary separator.

As best seen in FIG. 11, the main relay blower 139 is disposed below and offset from the material outlet 138 of the primary separator 132 with which it is in communication via a curved chute 177. The main relay blower 139 transports the discharged material at a relatively low velocity via a relay conduit 180 to the inlet 140 which is tangentially disposed at the top of the generally cylindrical secondary separator 134 (see FIG. 12). The secondary separator 134 includes a generally cylindrical separating chamber within a hollow casing 184 with the material discharge outlet 136 being located at the bottom of the casing 184. The separator 134 is essentially the same as the separator 84 shown in FIGS. 7–9. The separated air exiting the secondary separator 134 via the combined air exhaust conduit 142 is transported through the return air duct 150 (FIG. 10), driven by a blower 189 which discharges to an inlet duct 150a that connects to the inlet plenum 158 of the primary separator 132.

The conveyed material relayed from the primary separator 132 to the secondary separator 134 is separated from the relay air stream within the casing 184 of the secondary separator 132 with the separated air passing through a perforated arcuate rear boundary wall 192 and through a centrally disposed perforated tube 194, as explained with regard to the separator 84. The material exits the secondary separator 134 via the bottom material discharge outlet 136 and falls through a feed chute 196 to the hopper of a horizontal compactor or automatic baler 198.

The loop arrangement of the illustrated separating system 130 functions to eliminate the usual problem of dust in the vicinity of the baler 198 as a result of the very low static pressure at the material discharge outlet 136 of the secondary separator 134. For example, in a prototype separating system similar to the embodiment described wherein a pair of separators, each having such dual air exits, which are interconnected in such a loop configuration was operated so as to move a total air volume of about 46,000 cubic feet per minute, the static air pressure (gauge) in the feed chute was only 0.8 inch of water. This represents a significant further improvement compared to a single dual air exit separator operating as a part of a stand-alone separator system at a comparable volumetric air flow, which itself is improved over present commercial systems.

Still another advantage of the separating system 130 is realized by partitioning to create a plurality of individual air passageways leading to the chamber 200 which communicates with the air exhaust plenum 168. This partitioning creates the plurality of parallel passageways which function as compartments which can be individually closed off. The conduit partitioning arrangement is best described in conjunction with the illustrations of FIGS. 10, 13 and 14.

The chamber 200 is formed by a shallow rectangular-shaped duct 202 that contains short vertical dividers 204 that align with the partitions 171 that create the six separate passageways 162 through 167 shown in FIG. 10. The duct 202 which forms the chamber 200 preferably includes an access door 208 in each side wall, which door carries a pair of viewing ports 209.

Figure 13:
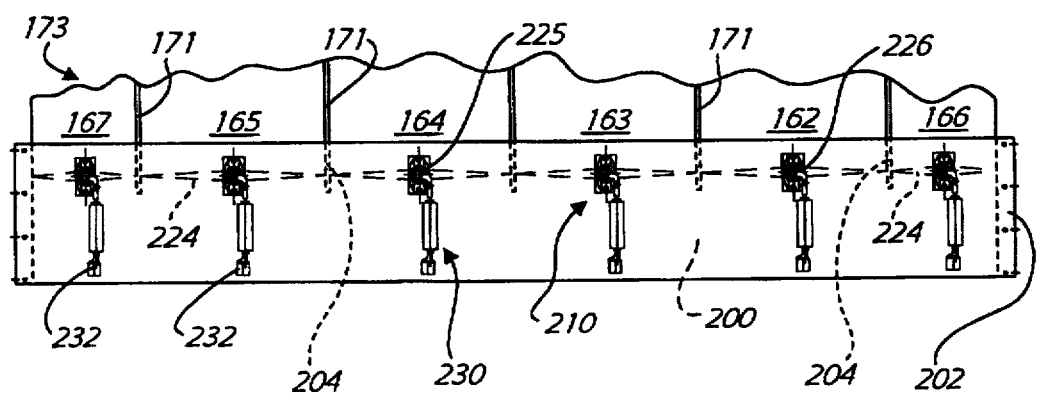
FIG. 13 is a fragmentary top view, enlarged in size, and partly in section of a portion of the system shown in FIG. 10 which operates as a screen cleaning mechanism for the separator.

The shallow duct 202 is fabricated to carry a damper mechanism 210 that includes a plurality of damper blades 224 that are adapted to open and close each of the passageways 162–167. The damper blades 224 are attached to elongated shafts 225 that are journaled in the upper and lower walls of the duct 202. A clevis and swivel bracket assembly 226 is connected to the upper end of each shaft 225 for opening and closing the dampers. When oriented in the closed position, as shown in FIG. 13, the damper blade 224 in each passageway extends laterally between two dividers 204 which extend the passageways formed by the partitions 171, blocking and closing that passageway. Conversely, when the damper blade 224 associated with a passageway is rotated 900 to the open position, the damper blade 224 is aligned parallel to the partitions 171 and allows free flow of air therethrough.

The actuating mechanism for opening and closing the damper blades 224 includes an air cylinder assembly 230 which is mounted on the top surface of the duct 202 and is connected at one end to the clevis and swivel bracket assembly 226 and at the other end to an upstanding bracket or backstop 232. The assembly 230 may include an air cylinder having a 2" bore and 4" stroke that is operated under the control of an external control unit. In the preferred method of operation, the air cylinder assemblies are actuated so that five of the six passageways always remain open, sequentially closing off only one of the six passageways (162 through 167) at any given time. As soon as the damper blade 224 for any one passageway is closed, a compressed air blast is introduced into the closed passageway upstream of the damper through a nozzle (not shown) to create a strong reverse flow of air in that passageway through the air exhaust conduit which cleans the associated section of the perforated arcuate outer wall 170 or perforated tube 172 of dust or any accumulated scrap material. The compartmentation of the exhaust chamber 173 permits the closing of one passageway at a time to cyclicly effect the cleaning thereof without affecting the remainder, so that there is no need to shut down the separating operation for cleaning. While one passageway is being closed to clean a section of the perforated arcuate outer wall 170 or of the perforated tube 172, the other passageways of the air exhaust chamber remain open and operative, serving to permit the free flow of air being separated in the separating chamber, as described above. In this manner, the perforated arcuate outer wall 170 and perforated metal tube 172 can be sequentially cleared of accumulating material without halting the continuous material separating operation.

From the foregoing, it should be appreciated that the present invention thus provides an improved method and apparatus for separator material entrained in a stream of air or similar transport medium. Further, it will be apparent that various changes may be made in the form, construction and arrangement of the parts thereof without departing from the spirit and scope of the invention or sacrificing all of its material advantages, the forms hereinbefore described being merely exemplary embodiments thereof. Therefore, it is not intended that the scope of the invention be limited to the specific embodiments and processes described. Rather, it is intended that the scope of this invention be determined by the appending claims and their equivalents.

What is claimed is:

1. A separating system for separating air from material transported by air, the separating system comprising:

a first separator including a composite inlet having a plurality of separate inlets adapted to receive several streams of air and entrained material and combine these streams into a composite stream, a first separation chamber, means for removing a prescribed volume of air from said composite stream through a boundary wall of said chamber, air exhaust conduit means operatively associated with said removing means, and an outlet adapted to discharge said originally entrained material;

a second separator having a second inlet adapted to receive material from said outlet of said first separator, a second separation chamber, second means for separating air from received material, and a lower material exit adapted to discharge said separated material from said second separator by gravity;

a relay conveying means for pneumatically transferring said material discharged from said outlet of said first separator to said second inlet of said second separator; and return conveying means operatively associated with said second air-separating means and with an inlet leading to one of said inlets to said first separator;

wherein said return conveying means transports said air separated in said second separation chamber to one said inlet of said first separator and thereby reduces the static head at said lower material exit.

2. The separating system of claim 1 wherein said means for removing said prescribed volume of air includes an arcuate outer wall of said separation chamber located between said inlet and said discharge outlet, which arcuate wall contains a plurality of perforations.

3. The separating system of claim 1 further comprising a stationary perforated tube centrally disposed within said first separation chamber and means for exhausting air that is removed through said perforated tube from the vicinity of said separator.

4. The separating system of claim 1 wherein said return conveying means includes blower means for creating a suction assist in removing air from said second separation chamber and for transporting said removed air to said inlet into said first separator.

5. The separating system of claim 4 wherein said relay conveying means includes a relay blower, first conduit means connecting said relay blower in communication with said material discharge outlet of said first separator, and second conduit means connecting a discharge from said relay blower to said second inlet of said second separator.

6. The separating system of claim 1 wherein said means for separating air from material in said second separation chamber includes an arcuate outer wall of said second separation chamber located between said inlet and said material exit, which arcuate wall contains a plurality of perforations.

7. The separating system of claim 6, said air separation means further comprising a stationary perforated tube centrally disposed within said second separation chamber and means for exhausting air in single conduit means from said second separator that is separated both through said perforated tube and through said arcuate outer wall.

8. The separating system of claim 1 wherein said first separator further includes a generally cylindrical casing having said inlet peripherally attached thereto and adapted to receive said composite stream of air and entrained material;

wherein said means for removing a prescribed volume of air includes (a) a perforated arcuate surface forming a section of the boundary of said casing which is located in alignment with said composite stream of air and material entering via said inlet so that said composite stream of air and material impinges thereagainst, and (b) a perforated tube centrally disposed within said casing; and wherein said air exhaust conduit means is peripherally attached to said casing and in fluid communication with a region downstream of said arcuate perforated surface and with a region interior of said perforated tube.

9. The separating system of claim 8 wherein said second separator further includes a generally cylindrical casing having said inlet peripherally attached thereto and adapted to receive said stream of air and entrained material;

wherein said second air separating means includes a perforated arcuate surface forming a section of the boundary of said casing which is located in alignment with said stream of air and material entering via said inlet so that said stream of air and material impinges thereagainst and a perforated tube centrally disposed within said casing; and wherein said return conveying means includes air exhaust conduit means which is attached to said casing and in fluid communication both with a region downstream of said arcuate perforated surface and with a region interior of said perforated tube.

10. A separating system for separating air from material transported by air, the separating system comprising:

a first separator including (a) a composite inlet adapted to receive several streams of air and entrained material and combine them into a composite stream, (b) a first separation chamber, (c) means within said chamber for removing a prescribed volume of air from said composite stream, (d) conduit means for exhausting said removed air from said first separator, and (e) an outlet adapted to discharge said originally entrained material from said chamber;

a second separator having (a) a second inlet adapted to receive material from said outlet of said first separator, (b) a second separation chamber, (c) means for separating air from received material in said second chamber, and (d) a lower material exit adapted to discharge said material from said second chamber by gravity;

a relay conveying means for pneumatically transferring said material discharged from said outlet of said first separator to said second inlet of said second separator; and return conveying means operatively associated with said air-separating means and with an inlet conduit leading said composite inlet of said first separator, wherein said return conveying means transports said air separated in said second separation chamber to said composite inlet of said first separator and thereby reduces the static head at said lower material exit.

11. The separating system of claim 10 wherein said second casing is a substantially cylindrical casing which has an arcuate perforated boundary wall and an internally disposed perforated tube, which are included in said air-separating means, and wherein said return conveying means includes a single conduit means that is attached to said second casing and is in fluid communication with both the interior of said perforated tube and with a region downstream of said arcuate perforated wall.

12. A separating system for separating air from material transported by air, the separating system comprising:

a separator casing having an inlet adapted to receive a stream of air and entrained material;

said casing having a perforated boundary surface adapted for removing a prescribed volume of air from said stream of air and material entering via said inlet thereby slowing the velocity of said air within said casing;

air exhaust conduit means peripherally attached to said casing and located downstream of said perforated surface, means partitioning said air exhaust conduit means into a plurality of separate passageways;

a plurality of damper mechanisms included within said air exhaust conduit means, each of said damper mechanisms being associated with and being adapted to selectively open or close one of said passageways to exhaust air flow therethrough; and an air flow reversal means operatively associated with each said passageway for selectively causing air flow in an upstream direction through said passageway and through a section of said perforated surface after said associated damper mechanism has closed said passageway;

wherein said upstream air flow sequentially through each of said passageways effectively removes accumulated material from sections of said perforated surface without halting operation of said separating system for cleaning.

13. A separating system according to claim 12 wherein said air exhaust conduit means includes a plurality of vertical partitions which form said plurality of passageways that extend generally horizontally in side-by-side relationship.

14. A separating system according to claim 13 wherein each said damper mechanism includes a damper blade proportioned to substantially block air flow through said associated passageway, which damper blade is mounted in said air exhaust conduit means on a rotatable shaft, and an actuating mechanism for selectively individually turning each of said shafts to cause said damper blade mounted thereon to move between an open position which allows exit air flow from said separator through said passageway and a closed position which halts said exit air flow through said passageway.

15. A separating system according to claim 14 wherein a fluid-actuated cylinder is operatively connected with each said shaft in a manner so that extension and retraction of said cylinders causes said damper blades to selectively pivot between the open and closed positions.

16. A separating system according to claim 15 wherein said air flow reversal means includes a plurality of nozzles for selective connection to source of compressed air, with each of said passageways having at least one said nozzle associated therewith, whereby a blast of compressed air through said nozzle which is introduced into said passageway when said associated damper blade is oriented in the closed position causes upstream air flow in said air exhaust conduit passageway and through a section of said perforated surface aligned therewith so as to remove any material accumulated upon said aligned section.

17. A separating system according to claim 13 wherein said casing is a substantially cylindrical casing which has an internally disposed perforated tube in addition to said perforated boundary surface which is arcuate, and wherein said air exhaust conduit means includes a separate conduit means that is attached to and is in fluid communication with each end of said perforated tube, with each separate conduit means leading to one of said passageways.

* * * * *